United States Patent [19]

Nakamura

[11] 4,234,702

[45] Nov. 18, 1980

[54] SILICONE RUBBER COMPOSITIONS

[75] Inventor: Akito Nakamura, Ichihara, Japan

[73] Assignee: Toray Silicone Company, Ltd, Tokyo, Japan

[21] Appl. No.: 22,576

[22] Filed: Mar. 21, 1979

[30] Foreign Application Priority Data

Apr. 21, 1978 [JP] Japan .................................. 53/46465

[51] Int. Cl.³ ........................ C08L 9/06; C08L 23/16; C08L 33/06; C08L 83/04
[52] U.S. Cl. ........................................ 525/100; 260/3; 525/101; 525/102; 525/105
[58] Field of Search ........................... 260/825, 827, 3; 525/101, 105, 100

[56] References Cited

U.S. PATENT DOCUMENTS

| | | | |
|---|---|---|---|
| 2,878,195 | 3/1959 | Hurd | 260/827 |
| 3,069,378 | 12/1962 | Prober | 260/827 |
| 3,227,777 | 1/1966 | Safford | 260/827 |
| 4,104,322 | 8/1978 | Snavely | 260/827 |

*Primary Examiner*—Wilbert J. Briggs, Sr.
*Attorney, Agent, or Firm*—Robert L. McKellar

[57] ABSTRACT

What is disclosed is a method of compatibilizing natural or synthetic organic rubber with silicone rubber in order to enhance the properties of the final rubber product. The method consists of compounding silicone rubber with natural and/or synthetic organic rubber in the presence of an additional organopolysiloxane having long chain carbon substituents attached to the silicon atoms.

4 Claims, No Drawings

SILICONE RUBBER COMPOSITIONS

BACKGROUND

The present invention consists of co-compounded silicone and organic rubbers which are made compatible by the addition of a second organopolysiloxane which contains long chain carbon substituents on silicon.

Various attempts have been made to manufacture rubber products by the vulcanization of blends of unvulcanized natural or synthetic rubber with unvulcanized organopolysiloxane rubber using peroxides as catalysts. The object in compounding natural or synthetic organic rubber with silicone rubber is to take advantage of the physical properties of each rubber in order,to enhance the physical properites of the final rubber product. However, in such compounded rubber systems, the differences in polymer solubility coefficients and viscosities is excessively great, and homogeneous dispersion by compounding is difficult. There are also great differences in the rates of vulcanization in the presence of organic peroxides. In addition, the heat co-vulcanization is difficult.

After vulcanization these prior art compounded rubbers have poor heat resistance just as do natural rubber or synthetic rubbers.

The inventor herein compounded rubber from natural rubber or synthetic rubber and silicone rubber, in an effort to obtain rubber compositions capable of being vulcanized with organic peroxides but not having the above-mentioned disadvantages.

When organopolysiloxanes that are substituted with monovalent aliphatic hydrocarbon radicals with 4–20 carbon atoms are added as a third component, the above-mentioned disadvantages of compounded rubbers are overcome.

This invention therefore consists of a composition of matter consisting essentially of (a) 5–95 parts by weight of an unvulcanized rubber selected from the group consisting of (i) natural rubber and (ii) synthetic organic rubber; (b) 5–95 parts by weight of an unvulcanized organopolysiloxane rubber wherein the silicon atoms in the organopolysiloxane rubber are attached to monovalent hydrocarbon radicals or substituted monovalent hydrocarbon radicals selected from a group consisting of methyl, vinyl, phenyl and 3,3,3-trifluoropropyl radicals and wherein at least 50 mol percent of all the hydrocarbon radicals are methyl; (c) 1–30 parts by weight based on 100 parts by weight of components (a) and (b) of an organopolysiloxane having the average unit formula

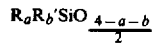

wherein R is a substituted or unsubstituted monovalent hydrocarbon radical selected from the group consisting of methyl, ethyl, vinyl, phenyl, naphthyl, β-phenylethyl, 2-phenylpropyl, 3-chloropropyl and 3,3,3-trifluoropropyl radicals and R' is a substituted or unsubstituted aliphatic monovalent hydrocarbon radical of 4 to 20 carbon atoms, a has a value of 1 to 2.5 and b has a value of 0.01 to 1.2 and a+b has a value of 1.9 to 3; (d) 0.1–15 parts by weight based on 100 parts by weight of components (a) and (b) of an organic peroxide.

Component (a), the organic rubbers, can be those types of rubbers which can be vulcanized in the presence of organic peroxides. These rubbers include natural raw rubber and synthetic rubber. Examples of synthetic rubber useful in this invention are isoprene polymers, butadiene polymers, styrene/butadiene copolymers, isoprene/isobutylene copolymers, chloroprene polymers, butadiene/acrylonitrile copolymers, ethylene/propylene copolymers, ethylene/propylene terpolymers, vinyl compound/acrylate copolymers (Acryl), polyester/isocyanate condensation products, polyester/isocyanate condensation products (polyurethanes), polyethers, ethylene/vinyl acetate copolymers, and chlorosulfonated polyethylenes. Ethylene/propylene terpolymers used in the present invention are terpolymers of ethylene, propylene and diene or triene.

Unvulcanized rubber with a high degree of crystallinity can be used directly. The conventional additives generally added to natural and synthetic rubbers such as reinforcing fillers, bulking agents, vulcanization auxiliaries, plasticizers, softening agents, pigments, antioxidants, and flame retardancy agents, can be added to the unvulcanized rubber. The types and the amounts of such additives can be appropriately selected according to the type of unvulcanized rubber used. However, the above expression "100 parts by weight" should be understood to mean "100 parts by weight of polymer".

These rubbers can be used singly or in combinations of two or more rubbers. The amount of component (a) employed depends upon the intended use of the product. It varies with the characteristics which are either based on the component (a) or component (b). The amount generally ranges from 5 to 95 parts by weight relative to 100 parts by weight of components (a) and (b) added together (calculated as polymer component without adjuvants).

Component (b), the diorganopolysiloxane rubber, in the present invention, is primarily a straight-chain diorganopolysiloxane with a high degree of polymerization having the unit formula

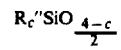

where R" is methyl, vinyl, phenyl or 3,3,3-trifluoropropyl radicals with methyl radicals constituting at least 50 mol % of all the organic radicals, and c is a number from 1.98 to 2.05.

Substances of the above type must be in the form of unvulcanized rubber. No restriction is placed on the degree of polymerization. It generally ranges from 1000 to about 10,000. Examples of units constituting the diorganopolysiloxane useful in this invention are dimethylsiloxane, methylphenylsiloxane, diphenylsiloxane, methylvinylsiloxane, phenylvinylsiloxane, and methyl-3,3,3-trifluoropropylsiloxane.

The diorganopolysiloxane can be a homopolymer or copolymers of these units, or a mixture of these polymers. However, methyl groups constitute at least 50 mol % of all the organic radicals. Units of the formula R'''SiO$_{1.5}$, where R''' has the meaning set forth above, for R" can be included in the structure in small amounts. The molecular chain end groups can be hydroxyl, alkoxy, trimethylsilyl, dimethylphenylsilyl and methylphenylvinylsilyl groups. The diorganopolysiloxane rubber component (b) can be compounded directly with components (a) and (c). However, reinforcing fillers such as fumed silica or wet process silica, and other additives which are commonly added to silicon rubbers can be added prior to compounding with other components.

Generally, from 5-95 parts by weight of component (b) is used in this invention.

Component (c), the organopolysiloxane, is an indispensable component in order to form a satisfactorily and homogeneously dispersed blend by improving the compatibility between the unvulcanized natural rubber or synthetic rubber and the organopolysiloxane unvulcanized rubber or silicone rubber, in order to be able to carry out the co-vulcanization in the presence of organic peroxides, and in order to improve the heat resistance of the vulcanized rubber product.

Component (c) is an organopolysiloxane having the average unit formula

wherein R is a substituted or unsubstituted monovalent hydrocarbon radical selected from the group consisting of methyl, vinyl, phenyl and 3,3,3-trifluoropropyl radicals and R' is a substituted or unsubstituted aliphatic monovalent hydrocarbon radical of 4-20 carbon atoms, a has a value of 1 to 2.5 and b has a value of 0.01 to 1.2 and a+b has a value of 1.9 to 3.

Examples of R useful in this invention are methyl, ethyl, propyl, vinyl, phenyl, naphthyl, $\beta$-phenylethyl, 2-phenylpropyl, 3-chloropropyl, and 3,3,3-trifluoropropyl radicals. Examples of R' useful in this invention are n-butyl, sec-butyl, t-butyl, n-pentyl, n-hexyl, 3-methylpentyl, cyclohexyl, n-heptyl, n-octyl, 2-ethylhexyl, 3,3-dimethylpentyl, n-nonyl, n-decyl, n-dodecyl, stearyl, palmityl and oleyl groups, and those in which one or more hydrogen atoms of long chain alkyl groups are replaced with chlorine atoms, hydroxyl groups or phenyl groups. However, unsubstituted aliphatic hydrocarbon and aralkyl radicals are the most useful.

a is a number of from 1 to 2.5, b is a number from 0.01 to 1.2, and a+b is a number from 1.9 to 3. R generally represents methyl, vinyl, phenyl or trifluoropropyl groups. b is preferably a number from 0.1 to 1.2 from the standpoint of improvement in heat resistance of the cured rubbers.

From the standpoint of molecular structure, molecules with a straight-chain structure or with a cyclic structure and with a+b of 2-3 are preferable. However, a slight amount of branched structure or three-dimensional network structure is allowable. The end groups of the molecules of straight-chain structure and slightly branched chain structure can include hydroxyl groups in addition to R and R'.

The degree of polymerization of component (c) is preferably above 2 but the upper limit is not particularly critical. In practice the degree of polymerization should not be more than about ten thousand due to inherent limitations of the available polymerization techniques.

The viscosity at 25° C. should preferably be below 100,000 cSt (100 Pa·s).

The amount of component (c) useful in this invention ranges from 1 to 30 parts by weight, relative to 100 parts by weight of the sum of components (a) and (b). If the amount is less than 1 part by weight, the improvement in the heat resistance is inadequate, whereas if the amount is greater than 30 parts by weight, the effects on the processability and physical properties of the resulting rubber become too great.

Component (d) in the present invention is an organic peroxide which is conventionally used with unvulcanized natural rubbers and synthetic rubbers. Examples of component (d) useful in this invention are benzoyl peroxide, 2,4-dichlorobenzoyl peroxide, di-tert-butyl peroxide, tert-butyl perbenzoate, dicumyl peroxide, 2,5-dimethyl-2,5-di(tert-butylperoxy)hexene, 2,5-bis(tert-butylperoxy)-2,5 dimethylhexane, dialkyl peroxide, ketal peroxide and 1,1-di(tert-butylperoxy)-3,3,5-trimethylcyclohexane.

The types of organic peroxides used in the present invention can be appropriately selected according to the types of natural rubber and synthetic rubber employed. The amount useful ranges from 0.1 to 15 parts by weight relative to 100 parts by weight of sum of components (a) and (b) (as polymer content).

The composition of the present invention can be obtained by the homogeneous blending of the four components (a), (b), (c) and (d). As mentioned in this specification for component (a), the conventional additives used with natural rubber and synthetic rubber can be optionally added to the compositions. Examples of these additives are as follows: reinforcing fillers and bulking agents: fumed silica, wet process silica, fine quartz powder, diatomaceous earth, carbon black, zinc white, basic magnesium carbonate, activated calcium carbonate, magnesium silicate, aluminum silicate, titanium oxide, talc, mica powder, aluminum sulfate, calcium sulfate, barium sulfate, asbestos, glass fiber, organic reinforcing agents, and organic fillers; vulcanization auxiliaries: metal oxides, amines, fatty acids and their derivatives; plasticizers: polydimethylsiloxane oils, phthalic acid derivatives, and adipic acid derivatives; softening agents: lubricating oil, process oil, coal tar, castor oil, beeswax, ricinolic acid, calcium stearate; antioxidants: phenylenediamines, phosphites, quinolines, cresols, phenols, and dithiocarbamate metal salts; and other additives such as colorants, UV absorbers, heat resisting agents, flame retardancy agents, foaming agents, scorch retarders, tackifiers and lubricants.

As mentioned in this specification for component (b), the conventional additives used with silicone rubber can be optionally added to the compositions. Examples of these additives are as follows: reinforcing fillers and bulking fillers: fumed silica, wet process silica, fine quartz powder, diatomaceous earth, carbon black, zinc white, magnesium silicate, aluminum silicate, titanium oxide, talc, mica powder, calcium sulfate, barium sulfate, asbestos, glass fiber; agents conventionally used for treating reinforcing fillers: low molecular weight alkoxy-terminal polydimethylsiloxane, diphenylsilanediol, trimethylsilanol; heat resistant agents such as iron oxides, cerium oxide, iron naphthenate, cerium naphthenate; flame retarders; oil resistance agents; foaming agents; and adhesion additives.

The compounded rubber of this invention can be prepared in the following manner. Component (a) is softened by blending using a Banbury mixer, kneader or a two-roll mill. Components (b) and (c) are added simultaneously, or component (b) is added at first and component (c) is added while the mixture is being blended, or component (c) is added at first and then component (b) is added while the mixture is being blended. Finally, component (d) is added and blended; alternatively, component (a) is softened as described above, and components (b), (c) and (d) are all added simultaneously and the mixture is blended; alternatively, components (a), (b) and (c) are added simultaneously to the above-mentioned mixer or roll mill and the mixture is blended, then component (d) is added to the homogeneous mixture; alternatively, all components (a), (b), (c) and (d) are added simultaneously to the above-mentioned mixer or roll mill and the mixture is blended; alternatively, all of or a portion of additives such as fillers, plasticizers, softening agents, antioxidants, vulcanizing agents and vulcanization accelerators are added to the component (a) in advance and the other three components are then added to the mixture, and the mixture is blended; alternatively, a mixture of (a) containing all or a portion of additives such as fillers, plasticizers, softening agents, antioxidants, vulcanizing agents and vulcanization accelerators, component (b) containing additives such as reinforcing fillers such as fumed silica or wet process silica and heat resistance improving agents, and component (c) are blended in the above-mentioned mixer or roll mill, and then the component (d) is added to the mixture and the mixture is blended.

Thus, the method of addition, the order of addition, the method of blending, the conditions for blending and the apparatus for blending are not critical. However, if the mixture contains component (d) the heat of the mixture must be controlled during blending at a sufficiently low level such that component (d) is not decomposed.

The compounded rubber compositions are generally vulcanized at a temperature ranging from 80° to 200° C. for a few minutes to 3 hours, under a pressure of 20–200 kg/cm². Secondary vulcanization or post cure can be carried out if needed, at a temperature ranging from 80° to 180° C. for 1 to 48 hours to obtain useful rubber products.

The vulcanized compounded rubber has excellent heat resistance compared to compounds without the addition of the component (c).

In the compounded rubber compositions of the present invention inadequate strength of silicone rubber is compensated by the natural rubber or synthetic rubber, while the inadequate heat resistance of natural rubber or synthetic rubber is compensated by the silicone rubber. Thus, the products can be serviceable in a wide range of applications requiring both strength and heat resistance.

Examples of this invention will be explained in detail as follows. The term "parts" used in these examples means "parts by weight".

EXAMPLE 1

Toa Acron AR-760 (acrylic rubber produced by Toa Paint Co., Ltd.)(70 parts) was softened using a two-roll mill. Methylvinylpolysiloxane unvulcanized rubber with hydroxyl end groups and a degree of polymerization of 5,000 (vinyl content: 0.142 mol %) (30 parts), Nibusil VN3 (wet process silica produced by Nippon Silica Industrial Co., Ltd.) (30 parts) and Celite Superfloss (diatomaceous earth produced by Johns Manville Corp., U.S.A.) (40 parts) were added to the roll and the mixture was blended. Trimethylsilyl-terminated methyl-n-dodecylpolysiloxane with a viscosity of 1,100 cSt (1.1 Pa·s) at 25° C. (n-dodecyl radicals made up to 40 mol % of all the organic radicals) (5 parts), zinc oxide (5 parts), Antage RD (quinoline antioxidant produced by Kawaguchi Chemical Co., Ltd.) (1 part) and stearic acid (1 part) were added and the mixture was blended until a homogeneous mixture was obtained. Dicumyl peroxide (purity: 40%) (5.5 parts) were added to the homogeneous mixture. The blend was treated at 160° C. under a pressure of 200 kg/cm² for 20 minutes to obtain a sheet with a thickness of 2 mm.

The resulting sheet was heat treated in the hot air circulation type oven at 150° C. for 4 hours as a post cure. The tensile strength and elongation were determined according to JIS K-6301. The rubber sheet obtained after the post cure was then stored in a hot air circulation type oven at 180° C. for 70 hours. The surface changes were determined by macroscopic inspection. The tensile strength and elongation of this specimen were determined according to JIS K-6301. As a comparison example, the rubber compositions without trimethylsilyl-terminated methyl-n-dodecylpolysiloxane, or with liquid paraffins used as a process oil in the conventional synthetic rubber were prepared under the same conditions described above and the rubber sheets were formed. The same characteristics were determined. The results obtained are presented in Table I.

As shown in Table I, the addition of trimethylsilyl-terminated methyl-n-dodecylpolysiloxane was found to be effective for improving the heat resistance.

EXAMPLE 2

EP-43 (ethylene/propylene terpolymer produced by Japan Synthetic Rubber Co., Ltd.) (80 parts) was softened by blending using a two-roll mill. Dimethylvinylsilyl-terminated methylvinylpolysiloxane unvulcanized rubber with a degree of polymerization of 5,000 (vinyl content: 0.103 mol %) (20 parts) and Nibusil VN3 (wet process silica produced by Nippon Silica Industrial Co., Ltd.) (48 parts) were added to the mixture. Trimethylsilyl-terminated methyl-n-octylpolysiloxane with a viscosity of 900 cSt (0.9 Pa·s) at 250° C. (n-octyl radicals made up 50 mol % of all the organic radicals) (12 parts), Antage RD (0.5 parts), zinc oxide (10 parts) and stearic acid (1.0 part) were added to the above mixture and the mixture was blended until a homogeneous mixture was obtained. Finally, dicumyl peroxide (purity: 40%) (5.0 parts) was added and the mixture was blended again until a homogeneous mixture was obtained. The mixture was treated at 160° C. under pressure of 200 kg/cm² for 20 minutes to obtain a sheet with a thickness of 2 mm. The resulting sheet was heat treated in a hot air circulation type oven at 150° C. for 3 hours as a post cure. The tensile strength and elongation of the sheet were determined according to JIS K-6301.

Samples of the rubber sheet obtained after the post cure were then stored in the hot air circulation type oven at 150° C. for 168 hours or were stored in the oven at 180° C. for 48 hours. The surface changes were determined by macroscopic inspection. The residual tensile strength and residual elongation were determined according to JIS K-6301.

As a comparison example, the rubber composition was prepared without trimethylsilyl-terminated methyl-n-octylpolysiloxane. The same characteristics were determined. The results obtained are presented in Table II.

As shown in Table II, the addition of trimethylsilyl-terminated methyl-n-octylpolysiloxane was found to be effective in improving the heat resistance.

EXAMPLE 3

A rubber sheet was prepared by the procedure described in Example 2, using trimethylsilyl-terminated methyl(2-phenylpropyl)polysiloxane instead of trimethylsilyl-terminated methyloctylpolysiloxane. The same tests as described above were carried out. As a comparison example, the rubber sheets were prepared without using trimethylsilyl-terminated methyl(2-phenylpropyl)polysiloxane, or liquid paraffins instead of trimethylsilyl-terminated methyl(2-methylpropyl)polysiloxane. The same tests were again carried out.

The results obtained are presented in Table III.

As shown in Table III, the addition of trimethylsilyl-terminated methyl(2-phenylpropyl)polysiloxane was found to be effective for improving the heat resistance.

EXAMPLE 4

SBR 1502 (styrene/butadiene copolymer produced by Nihon Geon K.K)(60 parts) was softened by blending using a two-roll mill. EPC black (30 parts), Antage RD (0.3 parts) and stearic acid (0.7 parts) were added to the above softened matter and the mixture was blended to obtain a rubber compound. On the other hand, a copolymer of dimethylsiloxane/methylvinylsiloxane/methylphenylsiloxane with methylvinylphenylsilyl end groups (dimethylsiloxane units: 86 mol %; methylvinylsiloxane units: 4 mol %; methylphenylsiloxane units: 10 mol %)(40 parts) was mixed with fumed silica (20 parts) with a surface of 200 m²/g, which had received a hydrophobicizing treatment with trimethylsilanol, and the mixture was blended to obtain a rubber compound.

The SBR rubber compound and silicone rubber compound were blended in the two-roll mill. Dimethylphenylsilyl-terminated methylphenyl-n-hexylpolysiloxane having a viscosity of 5,000 cSt (5 Pa·s) at 25° C. (n-hexyl radicals constituted 30 mol % and phenyl radicals constituted 10 mol % of all the organic radicals)(10 parts), and 2,5-dimethyl-2,5-di(t-butylperoxy)hexane (purity: 100%)(30 parts) were added to the above mixture and the mixture was blended until a homogeneous mixture was obtained. The homogeneous mixture was treated at 170° C. under a pressure of 200 kg/cm² for 10 minutes to obtain a sheet with a thickness of 2 mm. In addition, the resulting sheet was heat treated at 150° C. for 2 hours in the hot air circulation type oven as a post cure. The Tensile strength and the elongation were determined according to JIS K-6301.

The rubber sheet obtained after the post-cure was then stored in the hot air circulation type oven at 80° C. for 168 hours. The surface changes were determined by macroscopic inspection. The residual tensile strength and the residual elongation were determined according to JIS K-6301. As a comparison example, the rubber sheet was prepared under the same conditions but without the addition of dimethylphenylsilyl-terminated methylphenyl-n-hexylpolysiloxane. The same tests were carried out.

The results obtained are presented in Table IV.

TABLE I

|  | Present Invention | Comparison Example | Comparison Example |
|---|---|---|---|
| Toa Acron AR 760 | 70 | 70 | 70 |
| Trimethylsilyl-terminated methylvinyl polysiloxane rubber | 30 | 30 | 30 |
| Nibusil VN3 | 30 | 30 | 30 |
| Celite Superfloss | 40 | 40 | 40 |
| Zinc oxide | 5 | 5 | 5 |
| Antage RD | 1 | 1 | 1 |
| Stearic acid | 1 | 1 | 1 |
| Trimethylsilyl-terminal-n-dodecylpolysiloxane | 5 | — | — |
| Liquid Paraffin | — | — | 5 |
| Dicumyl peroxide (purity 40%) | 5.5 | 5.5 | 5.5 |
| Initial physical properties |  |  |  |
| Surface state | glossy | glossy | glossy |
| Tensile strength (pascals) | 647 × 10⁴ (66 kg/cm²) | 470 × 10⁴ (48 kg/cm²) | 490 × 10⁴ (50 kg/cm²) |
| Elongation (%) | 240 | 270 | 265 |
| after 74 hours at 180° C. |  |  |  |
| Surface state | glossy | Disappearance of gloss | Disappearance of gloss |
| Residual tensile strength (pascals) | 980 × 10⁴ (100 kg/cm²) | 961 × 10⁴ (98 kg/cm²) | 951 × 10⁴ (97 kg/cm²) |
| Residual elongation % | 80 | 61 | 60 |

TABLE II

|  | Present Invention | Comparison Example |
|---|---|---|
| EP-43 | 80 | 80 |
| Dimethylvinylsilyl-terminated methylvinyl polysiloxane rubber | 20 | 20 |
| Nibusil VN3 | 48 | 48 |
| Zinc oxide | 10 | 10 |
| Antioxidants | 0.5 | 0.5 |
| Stearic acid | 1 | 1 |
| Trimethylsilyl-terminated methyl-n-octylpolysiloxane | 12 | — |
| Dicumyl peroxide (purity 40%) | 5.0 | 5.0 |
| Initial physical properties |  |  |
| Surface state | glossy | glossy |
| Tensile strength (pascals) | 951 × 10⁴ (97 kg/cm²) | 1088 × 10⁴ (111 kg/cm²) |
| Elongation (%) | 730 | 650 |
| After 168 hours at 150° C. |  |  |
| Surface state | glossy | disapearance of gloss, appearance of white spots |
| Residual tensile strength (pascals) | 980 × 10⁴ (100 kg/cm²) | 931 × 10⁴ (95 kg/cm²) |
| Residual elongation (%) | 97 | 70 |
| After 48 hours at 180° C. |  |  |
| Surface state | glossy | disappearance of gloss, appearance of white spots |
| Residual tensile strength (pascals) | 980 × 10⁴ (100 kg/cm²) | 921 × 10⁴ (94 kg/cm²) |
| Residual elongation (%) | 91 | 73 |

TABLE III

|  | Present Invention | Comparison Example | Comparison Example |
|---|---|---|---|
| EP-43 | 80 | 80 | 80 |
| Trimethylsilyl-terminated methylvinyl polysiloxane rubber | 20 | 20 | 20 |
| Nibusil VN3 | 48 | 48 | 48 |
| Zinc oxide | 10 | 10 | 10 |
| Antage RD | 0.5 | 0.5 | 0.5 |
| Stearic acid | 1 | 1 | 1 |
| Dicumyl peroxide (purity: 40%) | 5.0 | 5.0 | 5.0 |
| Trimethylsilyl-terminated methyl(2-phenylpropyl)polysiloxane | 12 | — | — |
| Liquid paraffins | — | — | 12 |
| Initial physical properties |  |  |  |
| Surface state | glossy | glossy | glossy |
| Tensile strength (pascals) | 1000 × 10⁴ (102 kg/cm²) | 1088 × 10⁴ (111 kg/cm²) | 1127 × 10⁴ (115 kg/cm²) |
| Elongation (%) | 740 | 650 | 670 |
| After 168 hours |  |  |  |

TABLE III-continued

|  | Present Invention | Comparison Example | Comparison Example |
|---|---|---|---|
| at 150° C. |  |  |  |
| Surface state | glossy | disappearance of gloss | disappearance of gloss parial carbonization |
| Residual tensile strength (pascals) | 980 × 10$^4$ (100 kg/cm$^2$) | 931 × 10$^4$ (95 kg/cm$^2$) | 961 × 10$^4$ (98 kg/cm$^2$) |
| Residual elongation (%) | 92 | 70 | 68 |
| After 48 hours at 180° C. |  |  |  |
| Surface state | glossy | disappearance of gloss | disappearance of gloss, partial carbonization |
| Residual tensile strength (pascals) | 980 × 10$^4$ (100 kg/cm$^2$) | 921 × 10$^4$ (94 kg/cm$^2$) | 941 × 10$^4$ (96 kg/cm$^2$) |
| Residual elongation (%) | 91 | 73 | 69 |

TABLE IV

|  | Present Invention | Comparison Example |
|---|---|---|
| SBR-1502 | 60 | 60 |
| EPC | 30 | 30 |
| Antage RD | 0.3 | 0.3 |
| Stearic acid | 0.7 | 0.7 |
| Methylvinylphenylsilyl-terminated dimethylsiloxanemethylvinylsiloxane-methylphenylsiloxane copolymer rubber | 40 | 40 |
| Fumed silica treated by hydrophobicizing process using (CH$_3$)$_3$SiOH | 20 | 20 |
| Dimethylphenylsilyl-terminated methylphenyl-n-hexylpolysiloxane | 10 | — |
| 2,5-Dimethyl-2,5-di(t-butylperoxy)hexane | 3.0 | 3.0 |
| Initial physical properties |  |  |
| Surface state | glossy | glossy |
| Tensile strength (pascals) | 1971 × 10$^4$ (201 kg/cm$^2$) | 2079 × 10$^4$ (212 kg/cm$^2$) |
| Elongation (%) | 580 | 550 |
| After 168 hours at 150° C. |  |  |
| Surface state | glossy | disappearance of gloss, appearance of white spots |
| Residual tensile strength (pascals) | 980 × 10$^4$ (100 kg/cm$^2$) | 961 × 10$^4$ (98 kg/cm$^2$) |
| Residual elongation (%) | 99 | 73 |

That which is claimed is:

1. A composition of matter consisting essentially of
    (a) 5-95 parts by weight of an unvulcanized rubber selected from the group consisting of
        (i) natural rubber and
        (ii) synthetic organic rubber;
    (b) 5-95 parts by weight of an unvulcanized organopolysiloxane rubber wherein the silicon atoms in the organopolysiloxane rubber are attached to monovalent hydrocarbon radicals or substituted monovalent hydrocarbon radicals selected from a group consisting of methyl, vinyl, phenyl and 3,3,3-trifluoropropyl radicals and wherein at least 50 mol percent of all the hydrocarbon radicals are methyl;
    (c) 1-30 parts by weight based on 100 parts by weight of components (a) and (b) of an organopolysiloxane having the average unit formula

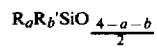

$$R_a R_b' SiO_{\frac{4-a-b}{2}}$$

wherein R is a substituted or unsubstituted monovalent hydrocarbon radical selected from the group consisting of methyl, ethyl, vinyl, phenyl, naphthyl, β-phenylethyl, 2-phenylpropyl, 3-chloropropyl and 3,3,3-trifluoropropyl radicals and R' is a substituted or unsubstituted aliphatic monovalent hydrocarbon radical of 4 to 20 carbon atoms, a has a value of 1 to 2.5 and b has a value of 0.01 to 1.2 and a+b has a value of 1.9 to 3;
    (d) 0.1-15 parts by weight based on 100 parts by weight of components (a) and (b) of an organic peroxide.

2. A composition as claimed in claim 1 wherein component (a) is selected from a group consisting of acrylic rubber, ethylene/propylene terpolymer and styrene-butadiene copolymer.

3. A composition as claimed in claim 1 wherein component (c) is selected from a group of organopolysiloxanes wherein R' is independently selected from n-hexyl, phenylpropyl, n-octyl and dodecyl.

4. A composition as claimed in claim 1 whenever it has been vulcanized by heating.

* * * * *